(12) United States Patent
Tanimoto et al.

(10) Patent No.: US 6,850,407 B2
(45) Date of Patent: Feb. 1, 2005

(54) ELECTRONIC APPARATUS HAVING TWO HOUSINGS COUPLED BY HINGE MECHANISM, ONE OF WHICH IS REVERSIBLE TO THE OTHER

(75) Inventors: Mitsuyoshi Tanimoto, Sagamihara (JP); Hiroshi Nakamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/421,801

(22) Filed: Apr. 24, 2003

(65) Prior Publication Data

US 2004/0012920 A1 Jan. 22, 2004

(30) Foreign Application Priority Data

Jul. 19, 2002 (JP) ...................................... 2002-211275

(51) Int. Cl.[7] .............................................. H05K 5/00
(52) U.S. Cl. ..................... 361/681; 361/683; 312/223.1; 312/223.2; 16/321; 16/337; 248/921; 248/923
(58) Field of Search ................................. 361/679–687; 16/319, 321–325, 337; 312/223.1, 223.2; 248/917–923; 349/58, 60

(56) References Cited

U.S. PATENT DOCUMENTS

| | | | | |
|---|---|---|---|---|
| 4,919,387 A | * | 4/1990 | Sampson | 248/371 |
| 5,268,817 A | | 12/1993 | Miyagawa et al. | |
| 5,335,142 A | * | 8/1994 | Anderson | 361/681 |
| 5,873,554 A | | 2/1999 | Nobuchi | |
| 6,076,786 A | * | 6/2000 | Meyer | 248/161 |
| 6,587,333 B2 | * | 7/2003 | Tseng et al. | 361/681 |
| 6,694,570 B2 | * | 2/2004 | Chen | 16/367 |
| 6,771,494 B2 | * | 8/2004 | Shimano | 361/681 |

* cited by examiner

*Primary Examiner*—Lynn Feild
*Assistant Examiner*—Anthony Q. Edwards
(74) *Attorney, Agent, or Firm*—Finnegan, Henderson, Farabow, Garrett & Dunner, L.L.P.

(57) ABSTRACT

An electronic apparatus has a first housing, a second housing, a hinge mechanism and an interlocking mechanism. The hinge mechanism couples the first and second housings so that the housings are relatively rotated about first and second axes intersected with each other. An interlocking mechanism decreases a rotational resistance between the first and second housings about one of the two axes, while the first and second housing are relatively situated to each other at a position of the rotation about the other axis.

13 Claims, 6 Drawing Sheets

ELECTRONIC APPARATUS HAVING TWO HOUSINGS COUPLED BY HINGE MECHANISM, ONE OF WHICH IS REVERSIBLE TO THE OTHER

CROSS-REFERENCE TO RELATED APPLICATIONS

This application is based upon and claims the benefit of priority from the prior Japanese Patent Application No. 2002-211275, filed Jul. 19, 2002, the entire contents of which are incorporated herein by reference.

BACKGROUND OF THE INVENTION

1. Field of the Invention

The present invention relates to an electronic apparatus in which the display panel having a touch panel attached to its display screen is reversible to the main body.

2. Description of the Related Art

Various types of electronic apparatuses equipped with many functions are being developed from year to year. Notebook type personal computers (hereinafter referred to as "notebook type PCs") are a type of portable electronic apparatus. Notebook type PCs comprise a main body, keyboard on the upper surface of the main body, and display panel coupled to one side of the main body by a hinge. The display panel can rotate about the hinge between a position in which it is laid on the keyboard, and a position in which it is raised from the main body.

As other types of electronic apparatuses, there are notebook type PCs having a touch panel layered to the display screen. In these PCs, input operations can be performed using the keyboard provided on the upper surface of the main body, and input operations concerning the information displayed on the display screen can be performed by touching the touch panel with a finger or pen.

In these PCs, the hinge has a rotation axis about which the display panel is raised, and a swivel axis about which the display panel is reversed (swiveled). When an input operation is performed by using the keyboard, the display panel is raised from the main body. On the other hand, when an input operation is performed using only the touch panel, the display panel is reversed so that the rear surface of the display panel opposite to the front surface with the touch panel faces the keyboard, and is superposed upon the main body.

To keep the display panel at an arbitrary position, the hinge of the notebook type PC has a rotational resistance about each of the two axes. If a user tries to raise a display panel from the main body of a notebook type PC as indicated by arrow, the display panel may unintentionally swivel about the swivel axis as indicated by arrow while it is being rotated to the raised position.

If the display panel is rotated in a direction that differs from the direction intended by a user, the display panel may collide with, for example, a keyboard. Further, an undesirable strong force may be exerted upon a hinge, thereby damaging it. In the light of this, users must move the display panel, paying attention to the balance of the rotation and swivel operations. If the rotational resistance about the swivel axis is increased to prevent unintentional swiveling, it becomes difficult to invert the display panel.

To solve this problem, Jpn. Pat. Appln. KOKAI Publication No. 9-185430 discloses an electronic apparatus (information processing device) in which the display panel (display section) is mechanically switched between the rotation and swivel operations when the panel is reversed. This electronic apparatus employs a locking bar, which suppresses the rotation operation of the display section and enables the swivel operation only in a position in which the display section with the touch panel (resistance film screen) is perpendicular to the main body. When reversing the display section, a user raises the display section to a position perpendicular to the main body, and then operates an operation lever to move the locking bar so as to suppress the rotation operation and enable the swivel operation. After the display section is swiveled through 180°, the operation lever is again operated to move the locking bar so as to suppress the swivel operation and enable the rotation operation. Thereafter, the display section is laid upon the main body, thereby exposing the resistance film screen to the outside. In this state, a handwriting input operation is enabled.

As described above, in this electronic apparatus, while the display section is being reversed, it is necessary to operate the operation lever to switch the operation between the rotation and swivel operations. If this switching operation is performed using one hand, this hand must grip only one of the display screen and operation lever at a time, and then the other, which is very troublesome. If, conversely, the switching operation is performed using both hands, one hand needs to grip the display section and the other hand needs to grip the operation lever. This means that the electronic apparatus must be operated when it is placed on, for example, a desk.

BRIEF SUMMARY OF THE INVENTION

According to an embodiment of the present invention, an electronic apparatus comprises a first housing, second housing, hinge mechanism and interlocking mechanism. The hinge mechanism couples the first and second housings so that the first and second housings are relatively rotated about first and second axes intersected with each other. The interlocking mechanism decreases a rotational resistance between the first and second housings about the first axis, while the first and second housings are relatively situated to each other at a position of the rotation about the second axis.

BRIEF DESCRIPTION OF THE DRAWINGS

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Figure 1:
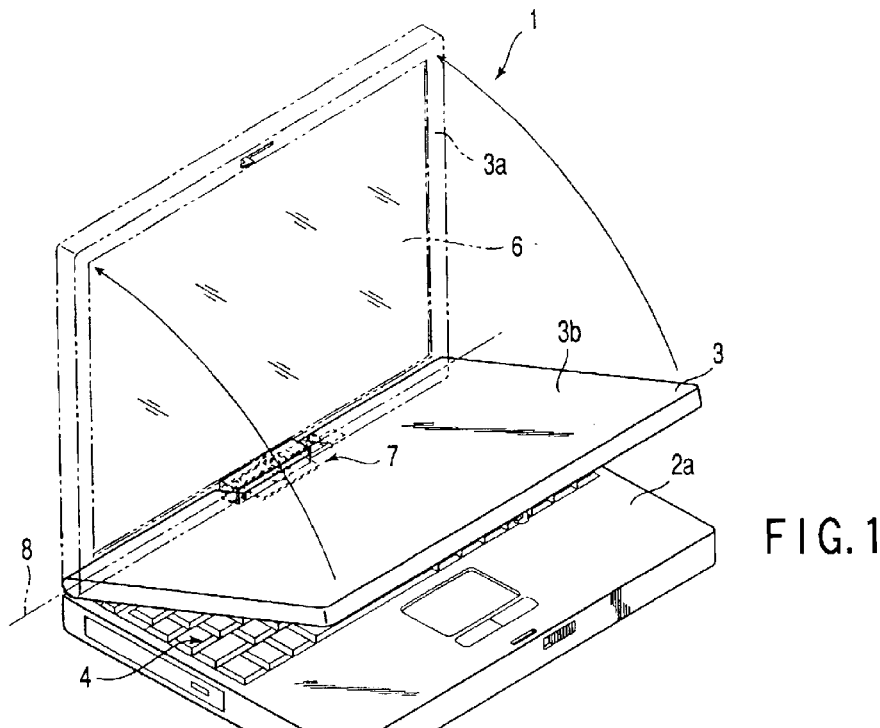
FIG. 1 is a perspective view illustrating an electronic apparatus according to an embodiment of the invention.

Referring to FIGS. 1–11, an electronic apparatus 1 according to a first embodiment of the invention will be described. As shown in FIG. 1, the electronic apparatus 1 comprises a main body 2 as a first housing, and display panel 3 as a second housing. The main body 2 contains a circuit board mounted with, for example, a CPU, and storage medium, etc., and has a keyboard 4 provided on its upper surface 2a. The display panel 3 has a liquid crystal display (hereinafter referred to as "LCD") 5 and touch panel 6. The LCD 5 is an example of a display section for displaying information, and is connected to the circuit board of the main body 2. The touch panel 6 is attached, in the form of a layer, to the display screen of the LCD 5, and is used to perform an input operation related to the information displayed on the LCD 5.

Figure 2:
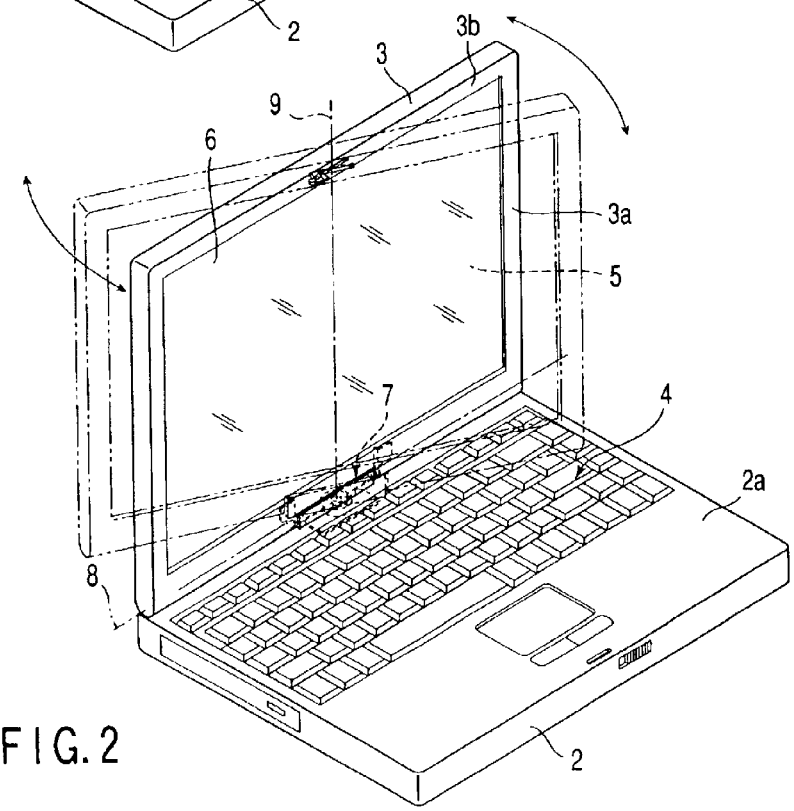
FIG. 2 is a perspective view illustrating a state in which the display panel of the electronic apparatus of FIG. 1 is swiveled about the swivel axis of the apparatus.
Figure 3:
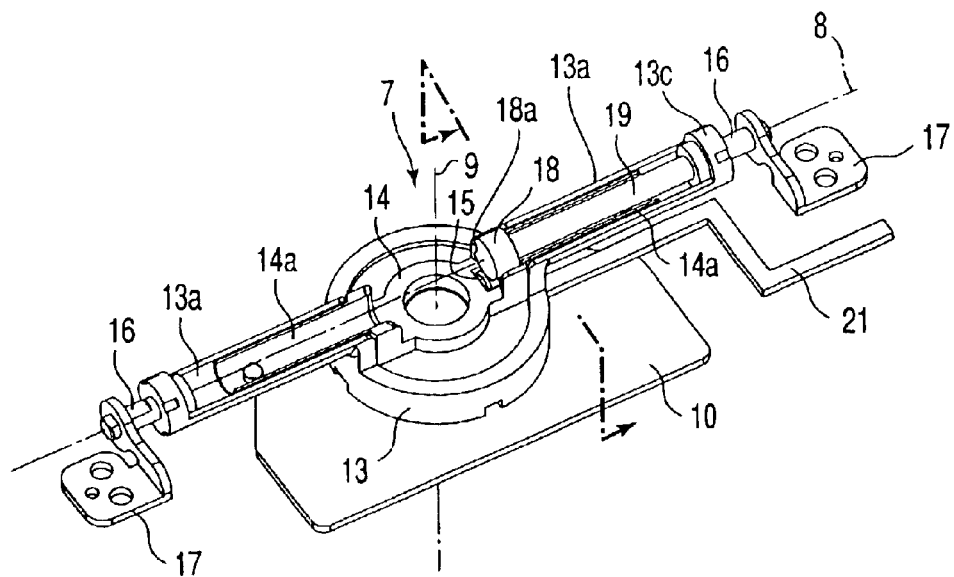
FIG. 3 is a perspective view illustrating a hinge incorporated in the electronic apparatus of FIG. 1.

The main body 2 and display panel 3 are coupled by a hinge 7. As shown in FIG. 3, the hinge 7 has two axes perpendicular to each other, i.e., a rotation axis 8 and swivel axis 9. As shown in FIG. 2, the display panel 3 is rotated on the rotation axis 8 from a state (first state) in which it opposes the main body 2 with the front surface 3a of the display panel 3 provided with the touch panel 6 directed to the keyboard 4, to an open state (second state) in which it does not directly oppose the main body 2. When the display panel 3 is perpendicular to the main body 2 and the touch panel 6 faces forwards, i.e., towards the front of the computer, this state is defined as the third state. The third state is included in the second (open) state. About the swivel axis 9, the display panel 3 is swiveled from the third state. This state is defined as the fourth state. Further, the state, in which the rear surface 3b of the display panel 3, opposite to the front surface 3a provided with the touch panel 6, faces to the keyboard 4, is defined as the fifth state. About the rotation axis 8, the display panel 3 can be further rotated from the third state, and also can be rotated towards the keyboard 4 from the fifth state. The state, in which the rear surface 3b is inclined towards the main body 2 from the fifth state, is defined as the sixth state. Further, the state, in which the display panel 3 exposing the touch panel 6 to the outside lays on the main body 2, is defined as the seventh state.

Figure 4:
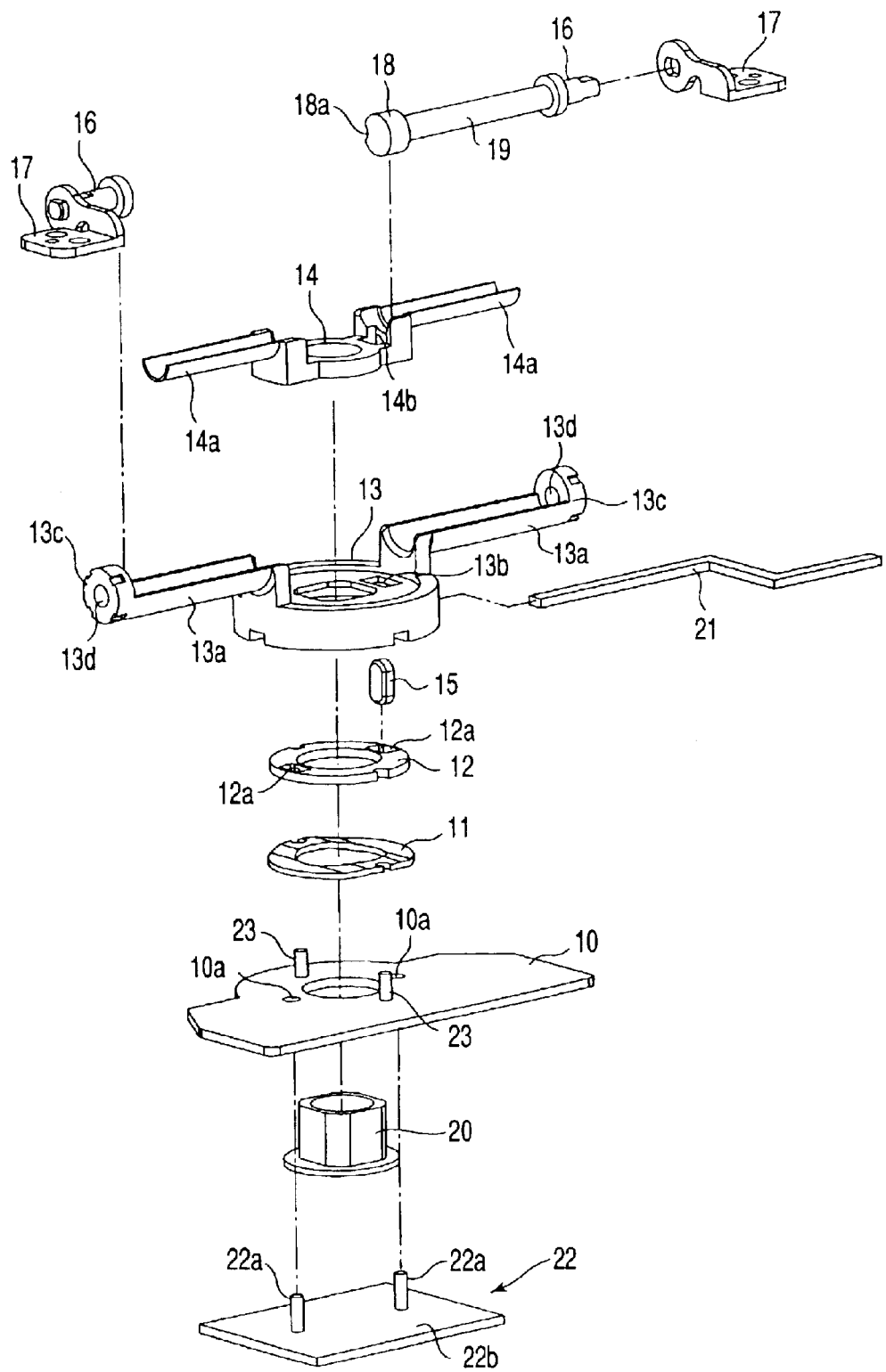
FIG. 4 is an exploded perspective view of the hinge shown in FIG. 3.

FIGS. 3 and 4 show the hinge 7. The hinge 7 serves as both a hinge mechanism and interlocking mechanism. Specifically, the hinge 7 comprises a base plate 10, spring washer 11, engagement ring 12, shaft support member 13 as a swivel shaft, reinforcing member 14, interlocking pin 15, rotation shafts 16, support brackets 17, cam 18, cam coupling shaft 19, swivel cylinder 20, swivel locking rod 21 and engagement ring shifting member 22.

The base plate 10 is fixed in the interior of the main body 2. The spring washer 11 and engagement ring 12 are provided between the base plate 10 and shaft support member 13. The spring washer 11 is urging means and is interposed between the engagement ring 12 and base plate 10. The engagement ring 12 is fixed by a pin 23 attached to the base plate 10 so that it does not rotate about the swivel axis 9. Further, the engagement ring 12 has engagement holes 12a formed as engagement sections at symmetrical positions with respect to the swivel axis 9. Radial grooves or depressions may be provided instead of the engagement holes 12a.

The shaft support member 13 has arms 13a extending along the rotation axis 8, symmetrically with respect to the swivel axis 9. The reinforcing member 14 has liners 14a extending along the arms 13a of the shaft support member 13. The interlocking pin 15 is fitted in interlocking holes 13b and 14b formed through the respective proximal ends of the arm 13a and liner 14a. The interlocking pin 15 is urged against the outer peripheral surface of the cam 18. If an engagement hole 12a has a bottom, the interlock pin 15 may be urged against the engagement ring 12.

The rotation shafts 16 are inserted in bearing holes 13d formed in the respective distal ends 13c of the arms 13a along the rotation axis 8, and can rotate about the rotation shaft 8. The distal ends 13c are squeezed after the rotation shafts 16 are inserted into the bearing holes 13d. By squeezing the distal ends 13c, the rotation shafts 16 are clamped within the bearing holes 13d, thereby generating a rotational resistance about the rotation axis 8. This resistance may also be generated by pinching each distal end 13c along the rotation axis 8.

The support brackets 17 are attached to the respective distal ends of the rotation shafts 16 and fixed to the display panel 3. The cam 18 is secured to the proximal end of one rotation shaft 16 by a coupling shaft 19. The outer periphery of the cam 18 is in contact with one end of the interlocking pin 15. A depression 18a is formed in the outer periphery of the cam 18. The depression 18a is engaged with the interlocking pin 15 when the display panel 3 secured to the support brackets 17 is in the third, fourth or fifth state.

The swivel cylinder 20 is inserted through the base plate 10, spring washer 11 and engagement ring 12 from the side opposite to the shaft support member 13 with respect to the base plate 10, and is secured to the shaft support member 13. A rotational resistance about the swivel axis 9 is generated by holding the base plate 10 between the shaft support member 13 and swivel cylinder 20.

The swivel locking rod 21 is attached to the base plate 10 so that it is movable toward the swivel axis 9. The swivel operation of the shaft support member 13 about the swivel axis 9 can be locked by inserting the swivel locking rod 21 into a recess formed in the end face of the shaft support member 13 opposing the base plate 10. The swivel locking rod 21 can be operated from the outside of the main body 2. Further, the swivel locking rod 21 is just an example of a locking mechanism for locking the swivel operation about the swivel axis 9, and another locking means may be employed. A solenoid or motor may be used to move the rod 21, instead of manually moving it.

The engagement ring shifting member 22, which is one aspect of an engagement adjusting member, comprises shifting pins 22a and shifting plate 22b. The shifting pins 22a are inserted from holes 10a formed in the base plate 10 to move the engagement ring 12 and spring washer 11 toward the interlocking pin 15. The shifting pins 22a are fixed on the shifting plate 22b, and move the positions of the engagement ring 12 and spring washer 11 when the shifting plate 22b is moved. As a result, the depth of engagement of the interlocking pin 15 and engagement ring 12 is adjusted. The shifting plate 22b can be adjusted step-by-step or continuously by operating, for example, a screw or wedge, from the outside of the main body 2.

In the case of FIGS. 3 and 4, the interlocking pin 15, cam 18, interlocking holes 13b, 14b and coupling shaft 19 are provided at only one of the arms 13a. However, they may be provided at both the arms 13a. Further, the interlocking pin 15 may have an oval shape as shown in FIG. 4, or may have a cylindrical shape with semi-spherical ends.

Figure 5:
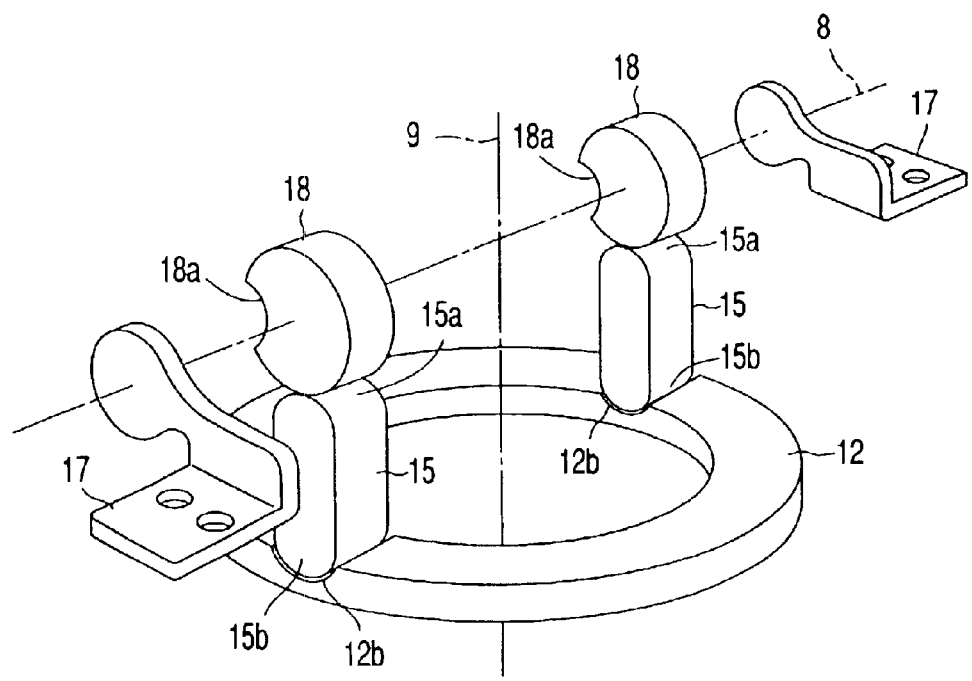
FIG. 5 is a perspective view schematically illustrating parts of the interlocking mechanism of the hinge shown in FIG. 3, arranged with mirror-image parts with respect to the swivel axis.
Figure 6:
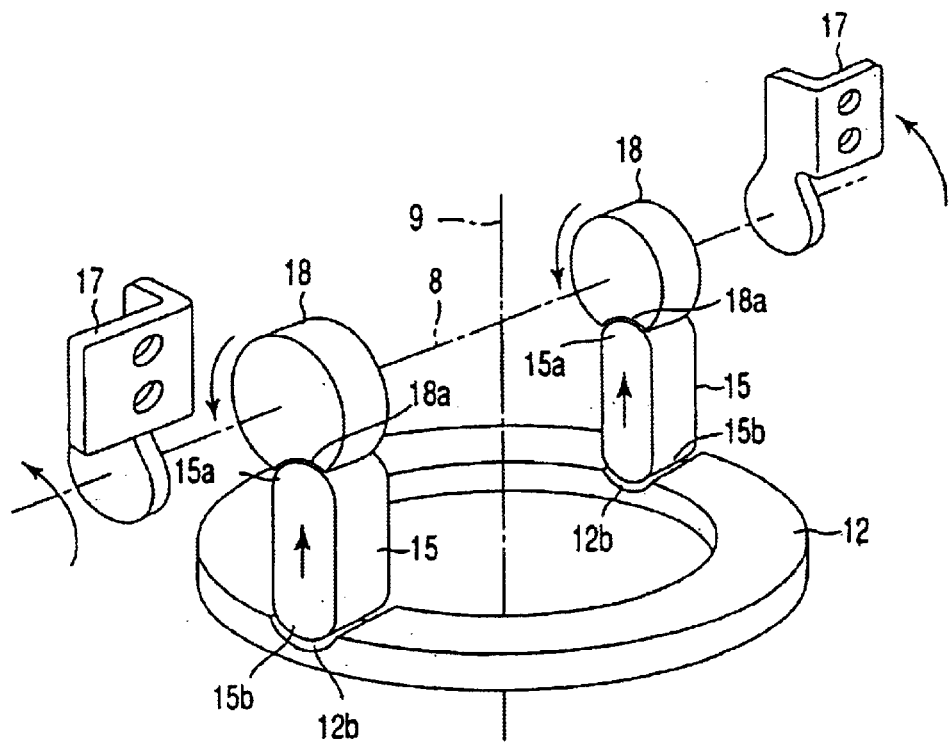
FIG. 6 is a perspective view illustrating the third state assumed by the interlocking mechanism of FIG. 5.
Figure 7:
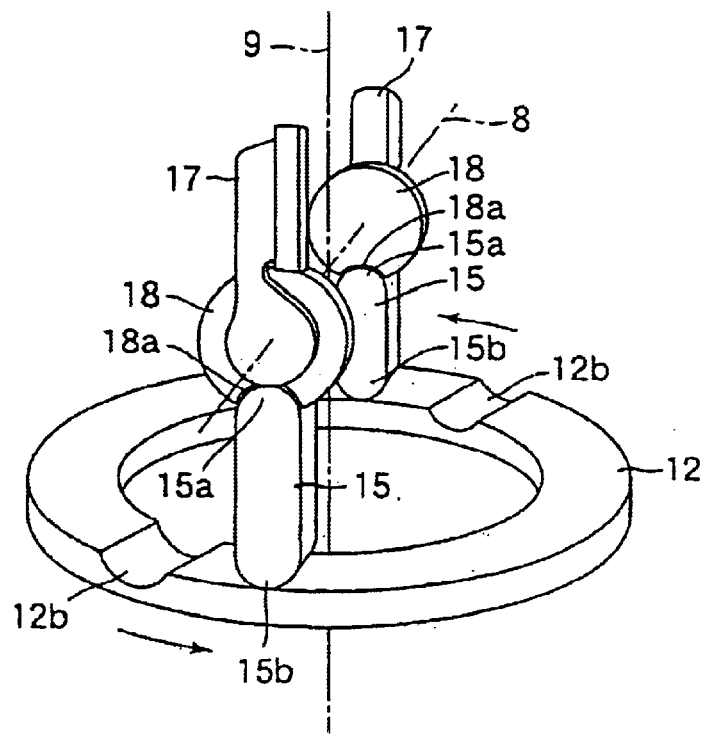
FIG. 7 is a perspective view illustrating the fourth state assumed by the interlocking mechanism of FIG. 5.

A description will now be given of the operation of the above-mentioned interlocking pin 15, cam 18 and engagement ring 12 of the hinge 7. FIGS. 5–7 schematically show the positional relationship between the engagement ring 12, interlocking pins 15, support brackets 17 and cams 18, assumed when grooves 12b are formed in the engagement ring 12 instead of the engagement holes 12a, and the interlocking pins 15 and cams 18 are provided at the respective proximal ends of the arms 13a.

The parts 12, 15, 17 and 18 are arranged as shown in FIG. 5 in the first state. In the first state, one end 15a of each interlocking pin 15 is in contact with the outer periphery of the corresponding cam 18, while the other end 15b is engaged with the corresponding groove 12b of the engagement ring 12. Accordingly, the display panel 3 easily rotates about the rotation axis 8, but does not easily swivel about the swivel axis 9. However, if the interlocking pins 15 are not deeply engaged with the grooves 12b and the engagement ring 12 can be warped, the display panel 3 can be rotated about the swivel axis 9 even in the first and second states. Even in this case, the display panel 3 does not swivel about the swivel axis 9 unless a user tries to swivel it, since the hinge shows a high resistance against the swiveling.

When the display panel 3 is raised from the first state to the third state as shown in FIG. 1, the cams 18 and support brackets 17 rotate as shown in FIG. 6. When the display panel 3 is in the third state in which it is vertical, end 15a of each interlocking pin 15 can be engaged with the depression 18a of the corresponding cam 18. When the display panel 3 is rotated about the swivel axis 9 from the third state to the fourth state as shown in FIG. 2, the interlocking pins 15 move toward the cams 18 as shown in FIG. 6. Accordingly, as shown in FIG. 7, the display panel 3 can be easily swiveled with a low resistance.

Further, in the fourth state shown in FIG. 7, end 15a of each interlocking pin 15 is engaged with the depression 18a of the corresponding cam 18, while the other end 15b is in contact with the engagement ring 12. In this state, the sliding resistance of the other end 15b of each interlocking pin 15 against the engagement ring 12 is lower than the resistance required to disengage the one end 15a from the depression 18a. Accordingly, the display panel 3 can more easily rotate about the swivel axis 9 than on the rotation axis 8.

In the fifth state, the interlocking pins 15 are situated in respective positions in which they can be engaged with the grooves 12b of the engagement ring 12, as in the third state shown in FIG. 6. In other words, the interlocking pins 15 can move to the grooves 12b. Therefore, the display panel 3 can rotate about the rotation axis 8 to move to the sixth state.

As described above, in the first, second, sixth or seventh state, the other end 15b of each interlocking pin 15 is engaged with the corresponding groove 12b of the engagement ring 12, thereby suppressing the rotation of the display panel 3 about the swivel axis 9. Thus, the display panel 3 is prevented from unintentionally rotating about the swivel axis 9, while it is being rotated about the rotation axis 8. Further, in the fourth state, since end 15a of each interlocking pin 15 fits in the depression 18a of the corresponding cam 18, the rotation of the display panel 3 on the rotation axis 8 is suppressed. Thus, the display panel 3 is prevented from unintentional rotation about the rotation axis 8, while it is being swiveled about the swivel axis 9.

As described above, the hinge 7 shows a low rotational resistance about the swivel axis 9 in the third, fourth and fifth states, and about the rotation axis 8 in the first, second, third, fifth, sixth and seventh states. In other words, the hinge 7 shows a low rotational resistance about the swivel axis 9 at a predetermined rotational position about the rotation axis 8, and shows a low rotational resistance about the rotation axis 8 at a predetermined swiveling position about the swivel axis 9. This means that the position of the display panel 3 determines which of the rotational resistance is higher between the rotational motion of the display panel 3 about the rotation axis 8 and the swivel motion of the display panel 3 about the swivel axis 9.

Therefore, when the display panel 3 is raised or inverted, the user feelingly realizes the difference of the rotational resistances between the rotational motion of the display panel 3 about the rotation axis 8 and the swivel motion of the display panel 3 about the swivel axis 9. Hence, the user is guided to rotate or swivel the panel 3 in a direction in which the panel can be moved at a lower resistance.

Figure 8:
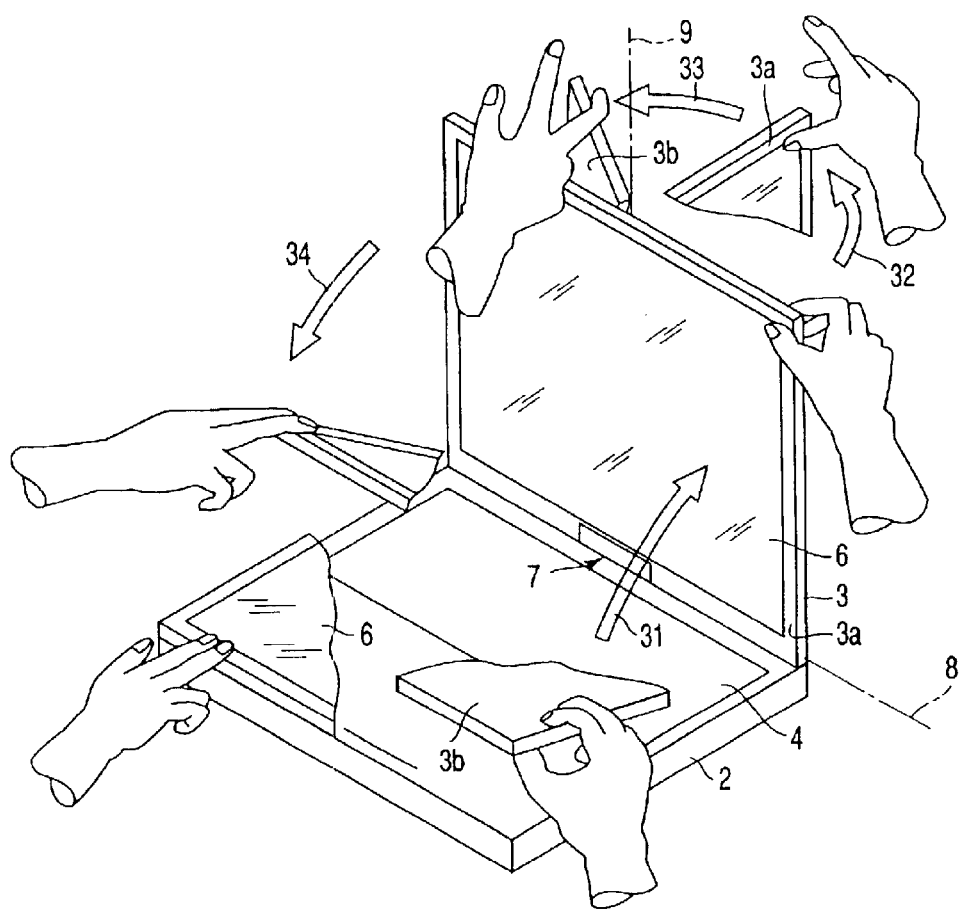
FIG. 8 is a perspective view schematically illustrating a series of operations performed for inverting the display panel of the electronic apparatus of FIG. 1 from the first state to the seventh state.

Referring to FIG. 8, a description will be given of when the display panel 3 is continuously operated from the first state to the seventh state. Firstly, as is indicated by arrow 31, the display panel 3 is rotated about the rotation axis 8 from the first state to the third state in which it is perpendicular to the main body 2. During this operation, the rotational resistance about the swivel axis 9 is higher than that about the rotation axis 8. Therefore, the user can easily raise the display panel 3 without swiveling it. In the third state, the interlocking pin 15 is movable, as described above with reference to FIGS. 5–7, thereby reducing the rotational resistance about the swivel axis 9. At this time, the display panel 3 is rotated about the swivel axis 9 from the third state to the fifth state, as is indicated by arrows 32 and 33. When the display panel 3 starts to rotate, the interlocking pin 15 fits into the depression 18a of the cam 18, thereby increasing the rotational resistance of the display panel 3 on the rotation axis 8. Accordingly, the user can easily swivel the display panel 3 about the swivel axis 9 without inclining the display panel 3 about the rotation axis 8. In the fifth state, the interlocking pin 15 is again movable and the resistance against the rotational motion is recovered to the original value.

Lastly, the display panel 3 is rotated (inclined) about the rotation axis 8, from the fifth state to the seventh state, toward the upper surface 2a of the main body 2 so that the touch panel 6 is exposed to the outside. When the display panel 3 is inclined, the interlocking pin 15 is engaged with the engagement hole 12a or groove 12b, thereby increasing the rotational resistance about the swivel axis 9. As a result, the user can easily rotate the display panel 3 about the rotation axis 8 from the fifth state to the seventh state, without swiveling the display panel 3 about the swivel axis 9.

As described above, since the electronic apparatus 1 is constructed such that the display panel 3 is prevented from being simultaneously rotated and swiveled, the continuous operation of reversing the display panel 3 can also be performed by one hand, as shown in FIG. 8.

Further, since the display panel 3 rotates about the axes one by one, which can be performed at a lower rotational resistance between the rotating motion about the rotation axis 8 and the swiveling motion about the swivel axis 9, the load on the hinge 7 is reduced. The swivel axis 9 of the hinge 7 does not incline to the main body 2, and hence the display panel 3 is prevented from colliding with, for example, the keyboard 4 of the main body 2 when the display panel 3 is reversed.

Figure 9:
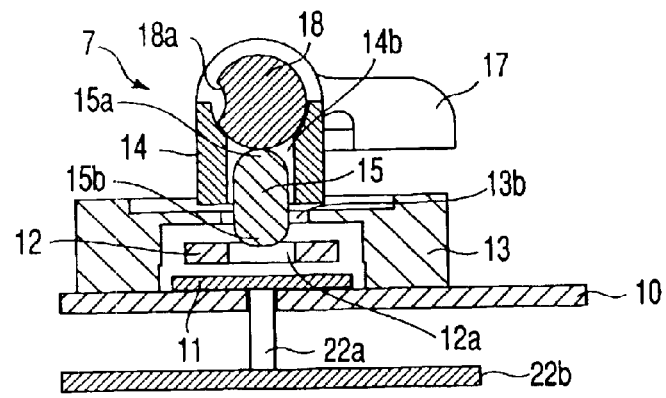
FIG. 9 is a sectional view taken along line A—A of FIG. 3, illustrating a state in which an engagement ring shifting member is remotest from a base plate.

The resistance against the rotation operation and swivel operation can be adjusted by the engagement ring shifting member 22. When the engagement ring shifting plate 22b is remotest from the base plate 10 as shown in FIG. 9, the display panel 3 is in the first state in which only the tip of the interlocking pin 15 enters the engagement hole 12a of the engagement ring 12. When the panel is in one of the third to fifth states and end 15a of the interlocking pin 15 fits in the depression 18a of the cam 18, the other end 15b of the interlocking pin 15 is completely out of the engagement hole 12a of the engagement ring 12. As a result, in the hinge 7, the rotational resistance against the swivel operation is decreased and the resistance against the rotation operation is increased.

Figure 10:
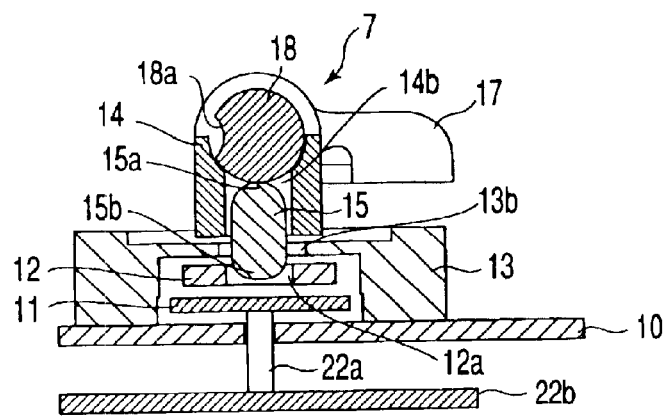
FIG. 10 is a sectional view taken along line A—A of FIG. 3, illustrating a state in which the engagement ring shifting member is closer to the base plate than in the state of FIG. 9.

FIG. 10 shows a state in which the engagement ring shifting plate 22b is closer to the base plate 10 than it is in FIG. 9. Even when the display panel 3 is in the third or fifth state, the other end 15b of the interlocking pin 15 slightly enters the engagement hole 12a. At this time, the round portion of the other end 15b only partially enters the engagement hole 12a. Further, the spring washer 11 can be warped by an amount greater than the depth to which the other end 15b enters the engagement hole 12a. Accordingly, although the rotational resistance that corresponds to the maximum warping amount of the washer 11 additionally increases against the swivel operation, the display panel 3 can still be swiveled. The interlocking pin 15 and engagement hole 12a of the engagement ring 12 may be shaped such that the engagement hole 12a has a counter bore, and the interlocking pin 15 has a cornered end shallower than the depth of the counter bore.

Figure 11:
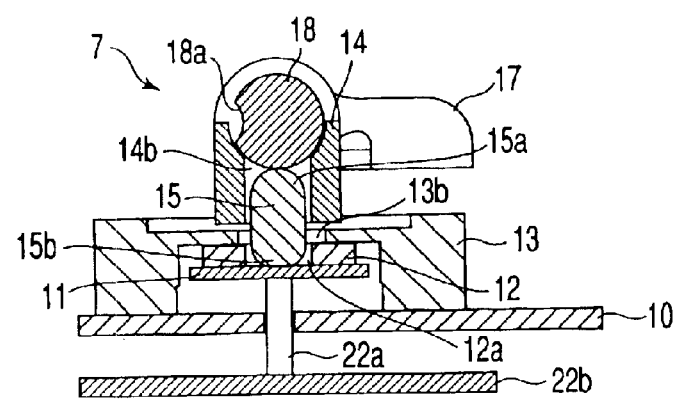
FIG. 11 is a sectional view taken along line A—A of FIG. 3, illustrating a state in which the engagement ring shifting member is closest to the base plate.

FIG. 11 shows a state in which the engagement ring shifting plate 22b is closer to the base plate 10 than it is in FIG. 10. When the display panel 3 is in the third or fifth state, the other end 15b of the interlocking pin 15 enters the engagement hole 12a to a depth greater than the maximum warping amount of the washer 11. In other words, the interlocking pin 15 is not disengaged from the engagement hole 12a, therefore the display panel 3 does not swivel.

Thus, the swivel operation of the display panel 3 can be changed by adjusting the engagement ring shifting plate 22b. For example, if the display panel 3 is often reversed, the engagement ring shifting plate 22b is adjusted as shown in FIG. 9. On the other hand, if the display panel 3 is rarely reversed, the engagement ring shifting plate 22b is adjusted as shown in FIG. 10. Further, if the display panel 3 does not need to be reversed, the engagement ring shifting plate 22b is adjusted as shown in FIG. 11.

In the embodiment, the state in which the display panel 3 is perpendicular to the main body 2 of the electronic apparatus 1 is defined as the third to fifth states. However, when the user reverses the display panel 3, the display panel 3 may be inclined about the rotation axis 8 with respect to the main body 2, if it can be kept at a certain angular position at which it can be easily reversed (swiveled).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and their equivalents thereof.

What is claimed is:

1. An electronic apparatus comprising:
   a first housing;
   a second housing;
   a hinge mechanism which couples the first and second housings so that the first and second housings are relatively rotated about first and second axes intersected with each other; and
   an interlocking mechanism which decreases a rotational resistance between the first and second housings about the first axis, while the first and second housings are relatively situated to each other at a position of the rotation about the second axis.

2. The electronic apparatus according to claim 1, further comprising a mechanism which fixes the relative rotation between the first and second housings about the one of the two axes intersected each other.

3. The electronic apparatus according to claim 1, wherein:
   the hinge mechanism includes a shaft support member which relatively positions the first and second axes intersecting each other; and
   the interlocking mechanism includes a first engagement member which rotates, together with the first housing, about the first axis relative to the shaft support member, a second engagement member which rotates, together with the second housing, about the second axis relative to the shaft support member, and an interlocking member engaged with one of engagement portions of the first engagement member when the first and second housings are situated at a rotational position about the first axis, the interlocking member being engaged with an engagement portion of the second engagement member when the first and second housings are situated at a rotational position about the second axis.

4. The electronic apparatus according to claim 3, wherein the interlocking member is interposed between the first and second engagement members.

5. The electronic apparatus according to claim 4, wherein the interlocking member is urged toward the first engagement member.

6. The electronic apparatus according to claim 4, wherein the interlocking member is urged toward the second engagement member.

7. The electronic apparatus according to claim 3, further comprising an engagement adjusting member which changes a depth to which the interlocking member is engaged with the first engagement member, thereby suppressing rotation about the first axis.

8. An electronic apparatus comprising:
   a main body;
   a display panel;
   a hinge mechanism which couples the main body and the display panel, and has a rotation shaft which rotates the display panel about an axis extending along one side of the display panel from a state in which the display panel opposes the main body, to a state in which the display panel is raised from the main body, the hinge mechanism also having a swivel shaft which swivels the rotation shaft about an axis intersecting an axis of the rotation shaft; and
   an interlocking mechanism which reduces a rotational resistance about the rotation shaft when the main body and the display panel are positioned at an angle about the axis of the swivel shaft, the interlocking mechanism reducing a rotational resistance about the swivel shaft when the main body and the display panel are positioned at an angle about the axis of the rotation shaft.

9. The electronic apparatus according to claim 8, wherein the swivel shaft is provided at an angle at which the display panel does not collide with the main body when the display panel is swiveled about the axis of the swivel shaft.

10. The electronic apparatus according to claim 8, further comprising a locking mechanism which locks swiveling about the axis of the swivel shaft.

11. The electronic apparatus according to claim 8, wherein the interlocking mechanism includes:

a cam that rotates about the axis of the rotation shaft together with the display panel;

an engagement member which rotates about the axis of the swivel shaft together with the main body; and an interlocking member located between the cam and the engagement member, and engaged with an engagement portion of the cam when the display panel is rotated about the axis of the rotation shaft and raised at a predetermined angle to the main body, the interlocking member being engaged with one of engagement portions of the engagement member when the rotation shaft is arranged extending along one side of the main body, the engagement portions of the engagement member being provided symmetrically with respect to the axis of the swivel shaft.

12. The electronic apparatus according to claim 11, further comprising an engagement adjusting member which changes a depth to which the interlocking member is engaged with the one of the engagement portions of the engagement member.

13. The electronic apparatus according to claim 11, wherein the interlocking member is urged toward the cam.

* * * * *